(12) United States Patent
Turner

(10) Patent No.: US 7,959,198 B2
(45) Date of Patent: Jun. 14, 2011

(54) MAGNETIC LINE RETRIEVAL SYSTEM AND METHOD

(75) Inventor: Mark Turner, Arlington, TX (US)

(73) Assignee: Labor Saving Systems, Ltd., Arlington, TX (US)

( * ) Notice: Subject to any disclaimer, the term of this patent is extended or adjusted under 35 U.S.C. 154(b) by 2074 days.

(21) Appl. No.: 10/430,747

(22) Filed: May 6, 2003

(65) Prior Publication Data

US 2003/0213943 A1    Nov. 20, 2003

Related U.S. Application Data

(60) Provisional application No. 60/381,119, filed on May 16, 2002.

(51) Int. Cl.
*H02G 1/08* (2006.01)
*B25J 15/06* (2006.01)

(52) U.S. Cl. ........ 294/65.5; 254/134.3 R; 254/134.3 FT

(58) Field of Classification Search ................. 294/65.5, 294/1.1; 254/134.3 R, 134.3 FT, 134.4, 134.5
See application file for complete search history.

(56) References Cited

U.S. PATENT DOCUMENTS

| | | | | |
|---|---|---|---|---|
| 1,772,126 | A * | 8/1930 | Ernest | 335/293 |
| 2,812,921 | A * | 11/1957 | Leith, Jr. | 254/134.5 |
| 2,954,257 | A * | 9/1960 | Besuch et al. | 248/206.5 |
| 2,970,003 | A * | 1/1961 | Heath, Jr. et al. | 294/65.5 |
| 2,971,381 | A * | 2/1961 | Tesi | 324/67 |
| 3,032,363 | A * | 5/1962 | Clayborne | 294/65.5 |
| 3,078,073 | A   | 2/1963 | Zizzo | |
| 3,477,050 | A * | 11/1969 | Hinger | 335/285 |
| 3,709,385 | A * | 1/1973 | Klapes et al. | 414/294 |
| 3,924,115 | A   | 12/1975 | Hampton et al. | |
| 3,924,631 | A * | 12/1975 | Mancusi, Jr. | 335/205 |
| 3,971,543 | A   | 7/1976 | Shanahan | |
| 4,076,242 | A * | 2/1978 | Joseph | 273/108.51 |
| 4,467,514 | A   | 8/1984 | Dahlke | |
| 4,572,561 | A   | 2/1986 | Hale | |
| 4,618,124 | A * | 10/1986 | Flowers | 254/134.3 FT |
| 5,148,108 | A * | 9/1992 | Dufour | 324/226 |
| 5,522,630 | A   | 6/1996 | James | |
| 5,813,712 | A * | 9/1998 | Mozelt | 294/65.5 |
| 6,206,978 | B1 * | 3/2001 | Tsui | 134/8 |
| 6,542,078 | B2 * | 4/2003 | Script et al. | 340/545.1 |

* cited by examiner

*Primary Examiner* — Paul T Chin

(74) *Attorney, Agent, or Firm* — James L. Baudino

(57) ABSTRACT

A system for detecting, capturing and retrieving a wire, optical cable, string, coaxial cable, or other line or object from within a wall or other type of enclosed structure. The system uses magnetic forces to detect and capture the object through a wall or other type of structure of the enclosure. The system also comprises a retrieval mechanism for drawing the object toward an opening in the enclosure for retrieval from the enclosure.

21 Claims, 5 Drawing Sheets

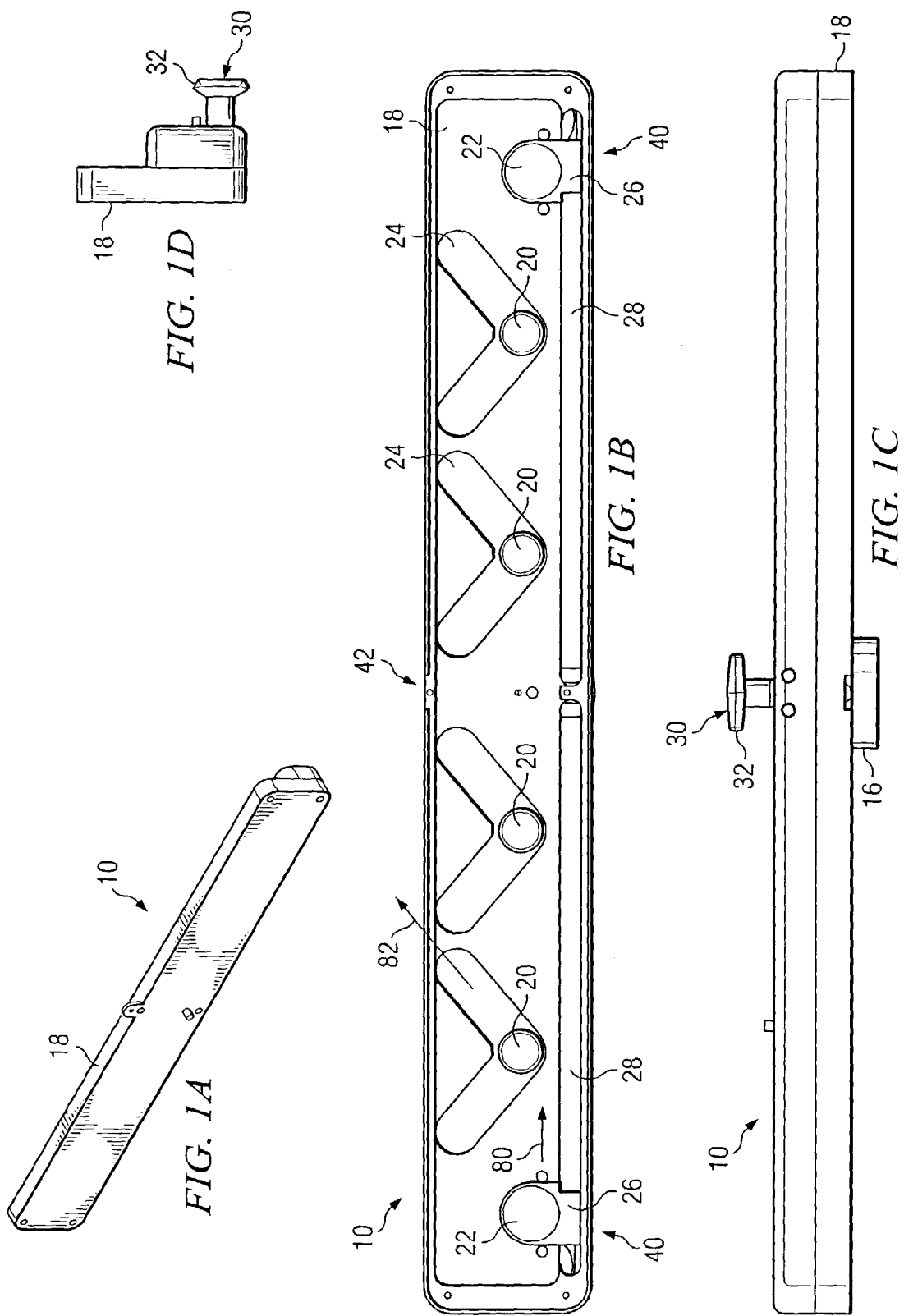

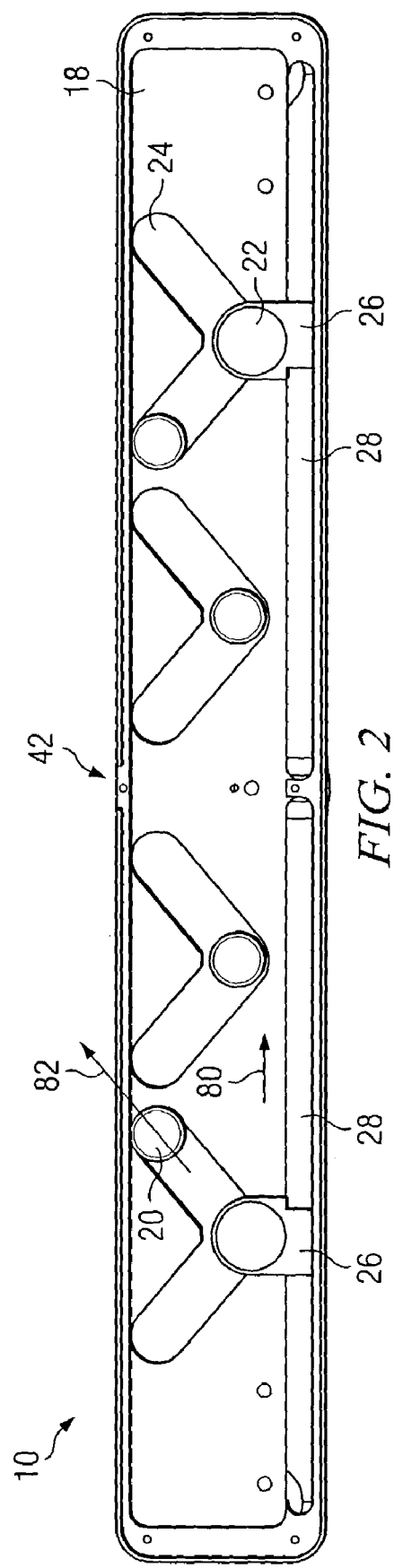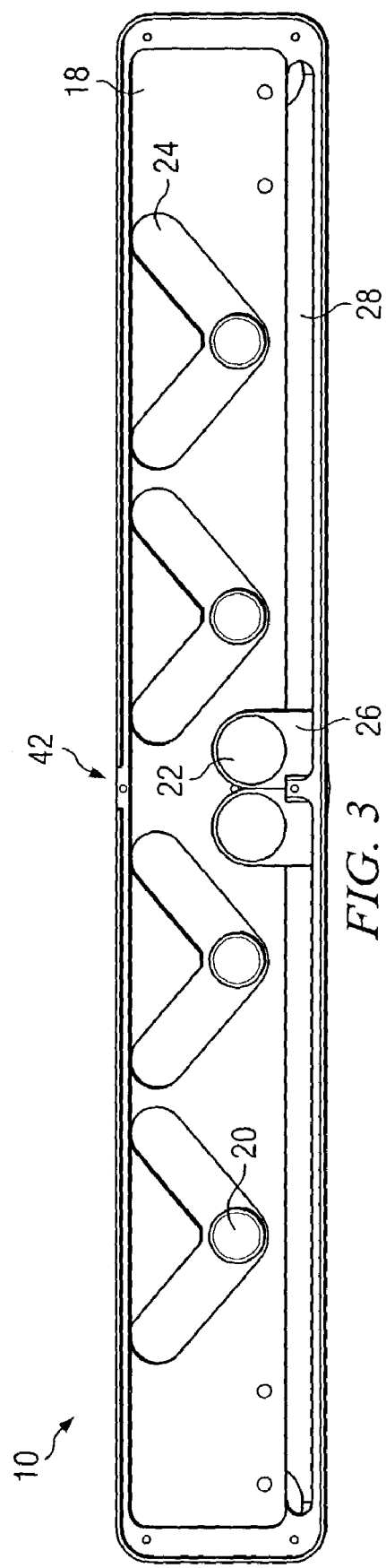

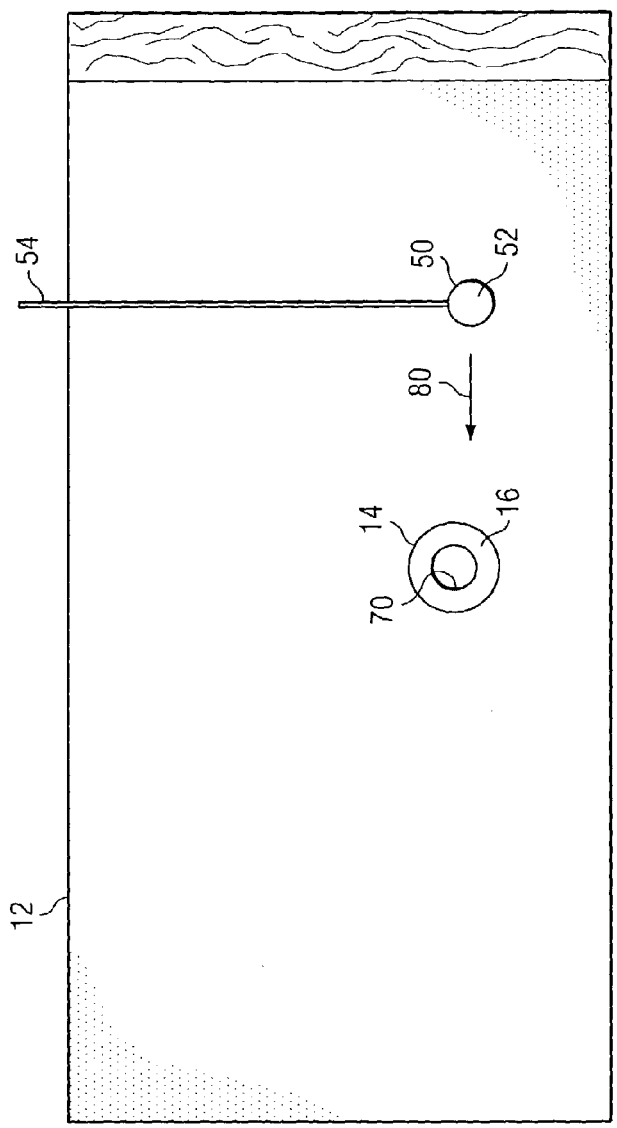
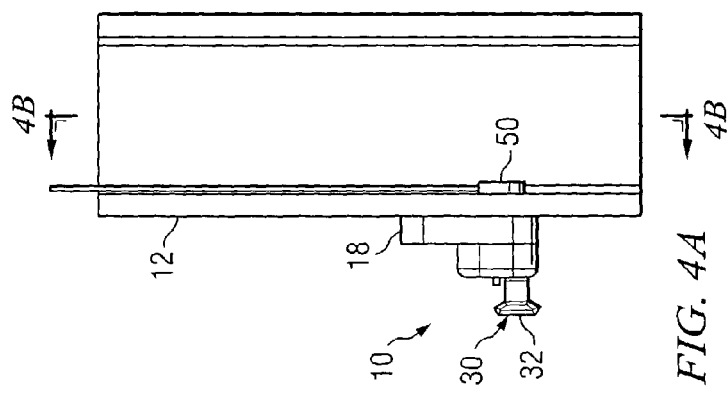
FIG. 4A
FIG. 4B

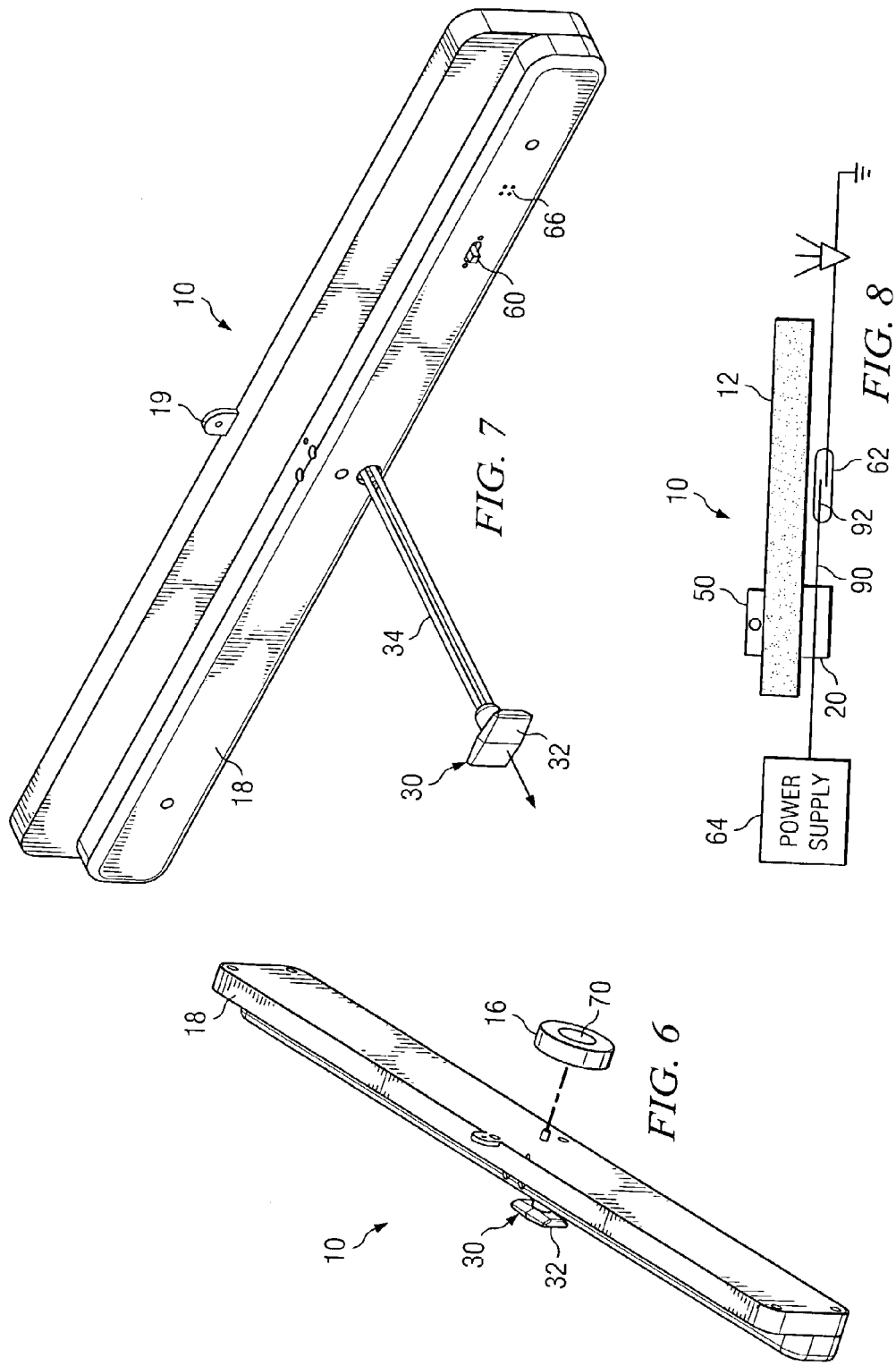

MAGNETIC LINE RETRIEVAL SYSTEM AND METHOD

CROSS-REFERENCE TO RELATED APPLICATIONS

This application claims priority to U.S. Provisional Application No. 60/381,119 filed May 16, 2002, entitled, "Line Retrieval System and Method."

TECHNICAL FIELD OF THE INVENTION

The present invention relates generally to the field of building and construction tools and, more particularly, to a line retrieval system and method.

BACKGROUND OF THE INVENTION

In the past, the most commonly used method of locating a suspended wire or line within a wall or other type of enclosed structure involved cutting a small hole in a portion of the wall, inserting a hooked rod through the hole, and attempting to snare and retrieve the line through the hole. This method involves considerable guesswork and error and is not easy to do even for an experienced technician.

SUMMARY OF THE INVENTION

The present invention relates to a system for detecting, capturing, and retrieving an object, such as a wire or line, from within a wall or other type of enclosure. In accordance with one embodiment of the present invention, a line retrieval system comprises a housing removably coupled to an enclosure and containing one or more magnets. Magnetic forces generated by the magnets are used to detect, attract and capture an object disposed within the enclosure through a wall or other type of structure of the enclosure. A retrieval mechanism may then be actuated to translate the object along an interior surface of the enclosure toward an opening in the enclosure, thereby providing for retrieval of the object through the opening.

The present invention provides several technical advantages. For example, electricians and installers of electrical fixtures, home entertainment centers, alarms, computer networks, and telephones in houses and other structures often spend considerable time and effort in locating and retrieving electrical wires, conduits, or other types of lines or cables. The present invention provides a quick and efficient method for retrieving objects from within walls or other types of enclosed structures. The line retrieval system of the present invention may be used by a single user, thereby substantially alleviating a requirement of multiple persons for retrieval tasks. Additionally, the present invention may be used in a variety of physical locations. For example, the system of the present invention may be easily rotated relative to the enclosure to accommodate various physical limitations or restrictions proximate to a retrieval location.

BRIEF DESCRIPTION OF THE DRAWINGS

FIG. 1A is a partially exploded diagram illustrating an embodiment of a line retrieval system in accordance with the present invention;

FIG. 1B is a diagram illustrating a plan view of the line retrieval system illustrated in FIG. 1A;

FIG. 1C is a diagram illustrating a top view of the line retrieval system illustrated in FIG. 1A;

FIG. 1D is a diagram illustrating a side view of the line retrieval system illustrated in FIG. 1A;

FIG. 2 is another diagram illustrating a plan view of the line retrieval system illustrated in FIG. 1A;

FIG. 3 is another diagram illustrating a plan view of the line retrieval system illustrated in FIG. 1A;

FIG. 4A is a diagram illustrating a side view of the line retrieval system illustrated in FIG. 1A relative to an enclosure;

FIG. 4B is a diagram illustrating a section view taken along the line 4B-4B of FIG. 4A relative top an enclosure;

FIG. 6 is a diagram illustrating a partially exploded view of the line retrieval system illustrated in FIG. 1A;

FIG. 7 is another diagram illustrating the line retrieval system illustrated in FIG. 1A; and FIG. 8 is a diagram illustrating an internal view of the line retrieval system illustrated in FIG. 1A.

DETAILED DESCRIPTION OF THE DRAWINGS

Figure 5A:
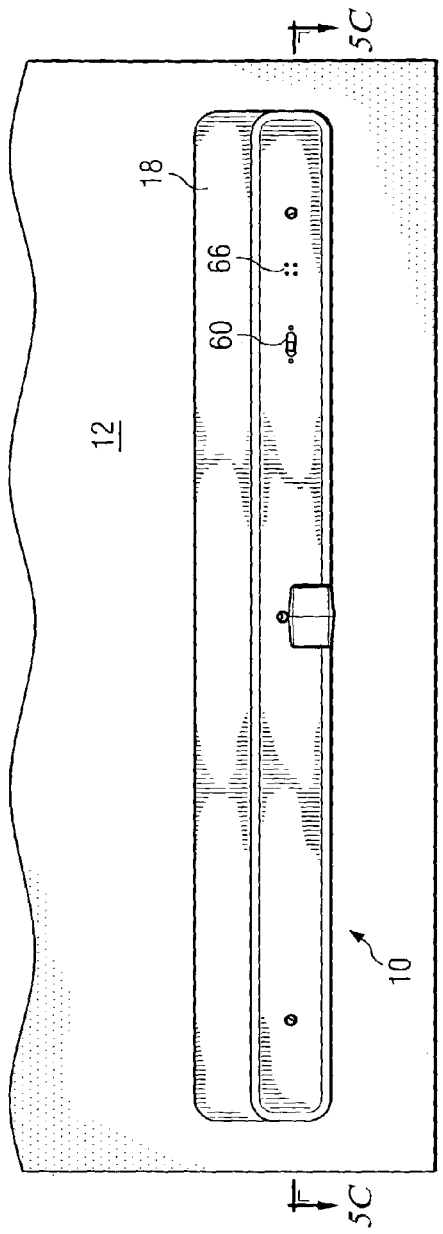
FIG. 5A is a diagram illustrating a plan view of the line retrieval system illustrated in FIG. 1A relative to an enclosure.
Figure 5C:
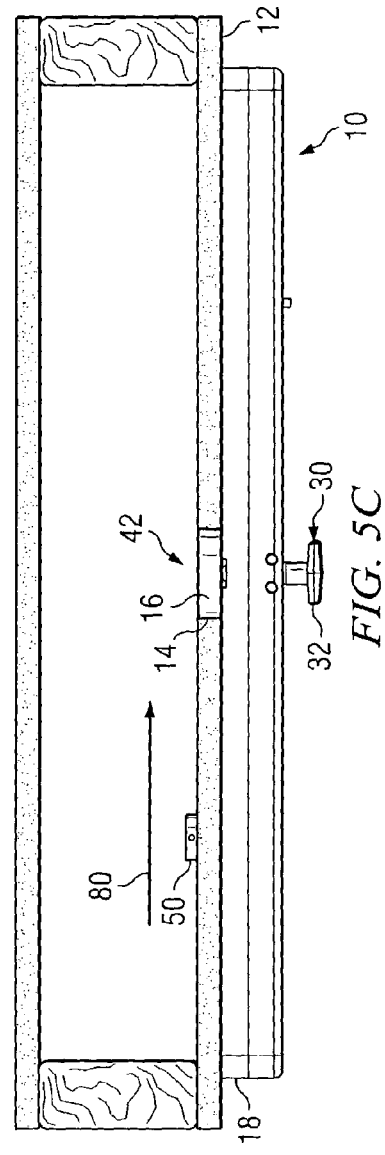
FIG. 5C is a diagram illustrating a section view taken along the line 5C-5C of FIG. 5A.
Figure 5B:
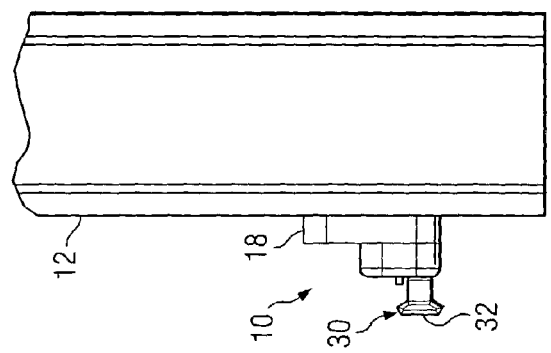
FIG. 5B is a diagram illustrating a side view of the line retrieval system illustrated in FIG. 5A relative to an enclosure.

FIGS. 1 through 8 are diagrams illustrating a line retrieval system 10 in accordance with one embodiment of the present invention. Briefly, in operation, a technician or other user couples the system 10 to a wall or other enclosure 12 through which a wire or line is to be retrieved. The line may comprise a telephone line, optical or coaxial cable, electrical wire, or other type of cable, wire, conduit or other structure of which retrieval from the enclosure 12 may be desired. A hole or other type of opening 14 may be formed in the enclosure 12 as best illustrated in FIGS. 4B and 5C. Next, the user of the system 10 may select and attach a boss 16 to a housing 18 corresponding to the size of the opening 14 as best illustrated in FIGS. 5C and 6. The housing 18 and boss 16 combination may then be coupled to the enclosure 12 as best illustrated in FIGS. 4A-4B and 5A-5C. For example, system 10 may be coupled to enclosure 12 using a fastener or other types of device extending through a fitting 19 of housing 18 and into enclosure 12. System 12 may also be coupled to exposure 12 by press-fit based on opening 14 and boss 16 clearances. However, other methods of releasably coupling system 10 to enclosure 12 may also be used.

As best illustrated in FIGS. 1A-1B, 2 and 3 (for ease of description, FIGS. 1B, 2 and 3 are illustrated having a portion of housing 18 removed), housing 18 comprises a plurality of internally disposed magnets 20 and 22. Each magnet 20 is disposed within a guide slot 24. In the illustrated embodiment, each guide slot 24 is configured having an inverted V-shape; however, it should be understood that guide slots 24 may be otherwise geometrically configured. Magnets 20 and slots 24 are located and configured to provide lateral movement of each magnet 20 over a predetermined distance relative to housing 18. For example, magnets 20 may be located having a spaced apart relationship relative to each other while generating a magnetic field encompassing a predetermined lateral distance relative to the housing 18. In the illustrated embodiment, four magnets 20 are used; however, it should be understood that a greater or fewer quantity of magnets 20 may be used.

Each magnet 22 is slidably coupled to housing 18 such that lateral movement of magnets 22 relative to housing 18 is also provided. For example, in the illustrated embodiment, each magnet 22 is coupled to a bracket 26 slidably disposed within a slot 28. Each bracket 26 is also coupled to a retrieval mechanism 30 adapted to initiate lateral movement of magnets 22 relative to housing 18. For example, in the illustrated embodiment, retrieval mechanism 30 comprises a handle 32 coupled to each bracket 26 via a cable 34 and actuatable by a user of system 10, as best illustrated in FIGS. 1B-1D, 2-3, 4A, 5B-5C, 6 and 7; however, it should be understood that other types of devices may also be used for retrieval mechanism 30. Additionally, it should be understood that system 10 may be adapted to accommodate automatic movement of magnets 22 relative to housing 18 without manual intervention. For example, as will be described in greater detail below, a motor or other type of electrical, hydraulic or pneumatic device may be used to generate lateral movement of magnets 22 relative to housing 18 upon the occurrence of a predetermined event.

In this embodiment, two magnets 22 are illustrated as being located, initially, at laterally disposed outer positions 40 relative to a central or medial location 42 of housing 18. However, it should be understood that a greater or fewer quantity of magnets 22 may be used and otherwise located. In the illustrated embodiment, magnets 22 also provide an increased lateral magnetic field relative to magnets 20. As will be described below in greater detail, magnets 22 are sized to generate a generally stronger magnetic field than magnets 20.

In operation, and as best illustrated in FIGS. 4A and 4B, the user of system 10 may lower an attracting object 50, such as a magnet 52 or other object generally attracted to magnetic fields, into the enclosure 12 from a location above system 10 until it is magnetically coupled to system 10. The object 50 may be attached to a leader 54, such as, but not limited to, a flexible member such as a string or small rope. Object 50 may also be coupled directly to the line to be retrieved from enclosure 12. Also, the line to be retrieved from enclosure 12 may already include a device or structure generally attracted to magnetic fields, thereby alleviating a requirement for object 50. Coupling of object 50 to system 10 is achieved through a wall or structure of the enclosure 50 by magnets 20 and/or 22. For example, as object 50 approaches system 10 from within enclosure 12, magnetic fields generated by magnets 20 and/or 22 attract object 50 to an inner surface of enclosure 12.

In the illustrated embodiment, as best illustrated in FIGS. 5A, 7 and 8, system 10 also comprises a signaling system 60 for notifying a user of system 10 of magnetically coupling of object 50 to magnets 20 and/or 22. In this embodiment, signaling system 60 comprises an open reed switch 62 coupled to each of magnets 20 and 22 for indicating to a user of system of coupling of magnet 52 to system 10. Each switch 62 is coupled to a power supply 64 and an audible alarm generator 66. In operation, as magnet 52 becomes coupled to one of the magnets 20 and/or 22, the contacts of a normally open reed switch 62 become closed by the force generated by the magnet 52. In response to the closed reed switch 62, an audible alarm is generated by generator 66, thereby indicating to a user of system 10 that magnet 52 coupled to system 10. Thus, after detecting the signal generated by generator 66, a user of system 10 may cease lowering of magnet 52 within enclosure 12. In the illustrated embodiment, signaling system 60 is adapted to generate an audible signal; however, it should be understood that other types of signals may also be generated by signaling system 60 to notify a user of system 10 of coupling of magnet 52 with system 10 such as, but not limited to, radio frequency signals or optical signals. Additionally, as described above, if object 50 does not comprise magnet 52, signaling system 60 may be otherwise configured to detect coupling of object 50 to system 10.

After object 50 becomes coupled to magnets 20 and/or 22, the user of system 10 may actuate retrieval mechanism 30 to direct object 30 toward opening 14 along an interior surface of enclosure 12, as best illustrated in FIGS. 1B, 2, 3 and 7. For example, as retrieval mechanism 30 is actuated, magnets 22 translate inwardly toward medial location 42 and opening 14, as best illustrated in FIGS. 1B, 2 and 3 along the direction indicated generally at 80. As magnets 22 approach magnets 20, the magnetic forces generated by magnets 22 repel corresponding magnets 20 and cause magnets 20 to move upwardly within the corresponding guide slot 24, as best illustrated in FIGS. 1B and 2 along the direction indicated generally at 82. Movement of magnets 20 within guide slots 24 allows magnets 22 to move beneath magnets 20. Additionally, if object 50 is coupled to one of magnets 20, object 50 will be transferred to the magnet 22 as magnets 22 moves beneath magnets 20 because of the greater magnetic strength of the magnets 22. Thus, object 50 becomes coupled to magnet 22 while magnet 22 continues to move inwardly toward medial portion 42 and opening 14 until magnet 22 reaches a boss magnet 70 coupled to boss 16, as best illustrated in FIGS. 4B and 6. Boss magnet 70 is disposed within or near opening 14 such that as magnets 22 and object 50 approach boss magnet 70, the magnetic forces generated by boss magnet 70 cause object 50 to be coupled to boss magnet 70. After object 50 becomes coupled to boss magnet 70, system 10 may be removed from enclosure 12, thereby also retrieving the object 50 through opening 14. Leader 54 coupled to object 50 may then be used to retrieve a line through opening 14. As described above, if object 50 is not required, the line to be retrieved from enclosure 12 may be similarly lowered into enclosure 12, directed toward opening 14 using magnets 20, 22 and/or 70, and retrieved through opening 14.

In the illustrated embodiment, signaling system 60 is adapted to detect magnet 52 while substantially or completely avoiding detection of magnets 20 and 22. For example, as best illustrated in FIG. 8, reed switches 62 are disposed in substantially the same plane as magnets 20 and 22. Thus, when the reed switches 62 are arranged in this manner, the magnetic forces of magnets 20 and 22 are acting in a more axial direction, as indicated generally at 90, to the reed switch 62 contacts. Generally, these axial forces are insufficient to close the reed switch 62. However, due to the distance caused by a wall or other structure of the enclosure 12, the magnetic force of magnet 52 is acting in a more radial direction, as indicated generally at 92, thereby closing the contacts of reed switch 62 and completing the circuit of the signaling system 60.

What is claimed is:

1. A line retrieval system, comprising:
   a housing adapted to be releasably coupled to an enclosure, the housing comprising a plurality of magnets; and
   a retrieval mechanism coupled to the housing and actuatable to move at least one of the plurality of magnets from an outer position within the housing to a medial position within the housing to retrieve a line from within the enclosure through an opening formed in the enclosure, the line coupled to an object attracted to the magnets.

2. The system of claim 1, further comprising a signaling system adapted to indicate coupling of the object to at least one of the magnets.

3. The system of claim 1, wherein at least one of the plurality of magnets is adapted to translate within the housing toward the opening.

4. The system of claim 1, wherein at least one of the magnets is adapted to generate a magnetic field greater than a magnetic field generated by a remaining quantity of the plurality of magnets.

5. The system of claim 1, wherein the retrieval mechanism comprises:
  a bracket coupled to at least one of the magnets; and
  a handle coupled to the bracket.

6. The system of claim 1, further comprising:
  a generator adapted to alert a user of a magnetic coupling of at least one of the magnets to the object; and
  at least one switch adapted to actuate the generator.

7. The system of claim 1, wherein at least one of the magnets is disposed within a slot of the housing, the slot adapted to provide lateral movement of the magnet relative to the housing.

8. The system of claim 1, wherein the plurality of magnets comprises a first magnet and a second magnet, the first magnet adapted to transfer the object from being magnetically coupled to the second magnet toward the opening.

9. A line retrieval system, comprising:
  means for coupling a housing to an opening formed in an enclosure;
  means for drawing an object disposed within the enclosure to an interior surface of the enclosure; and
  means for moving the drawing means from an outer position within the housing to a medial position within the housing to draw the object along the interior surface of the enclosure toward the opening.

10. The system of claim 9, further comprising means for generating an alert indicating coupling of the object to the means for drawing the object to the interior surface of the enclosure.

11. The system of claim 9, further comprising means for generating an audible alert indicating coupling of the object to the means for drawing the object to the interior surface of the enclosure.

12. The system of claim 9, further comprising means for providing lateral movement of the means for drawing the object to the interior surface of the enclosure relative to the housing.

13. The system of claim 9, wherein the means for drawing the object to an interior surface of the enclosure comprises means for magnetically drawing the object to the interior surface of the enclosure.

14. The system of claim 9, wherein the means for moving the drawing means comprises means for transferring the object from being coupled to the means for drawing the object to the interior surface of the enclosure toward the opening.

15. A line retrieval system, comprising:
  a housing;
  a first magnet disposed within the housing and adapted to attract an object disposed within an enclosure toward an interior surface of the enclosure; and
  a second magnet adapted to transfer the object from the first magnet to an opening formed in the enclosure.

16. The system of claim 15, further comprising a signaling system adapted to alert a user of a magnetically coupling of the object to the first magnet.

17. The system of claim 15, further comprising a retrieval mechanism coupled to the second magnet and actuatable by a user to transfer the object to the opening.

18. The system of claim 15, further comprising a slot formed in the housing and adapted to enable lateral movement of the first magnet relative to the housing.

19. The system of claim 18, wherein the slot is further configured to enable movement of the first magnet away from the second magnet during transfer of the second magnet adjacent to the first magnet.

20. The system of claim 15, wherein a magnetic strength of the second magnet is greater than a magnetic strength of the first magnet.

21. A line retrieval system, comprising:
  a housing having a first magnet disposed therein for attracting an object disposed within an enclosure toward an interior surface of the enclosure, the housing having a second magnet movable past the first magnet and configured to attract the object from the first magnet and move the object toward an opening formed in the enclosure.

\* \* \* \* \*